T. H. FREEMAN.
PROCESS AND INSTRUMENTALITY FOR MAKING HORSESHOES.
APPLICATION FILED OCT. 4, 1919.
1,360,204.
Patented Nov. 23, 1920.
2 SHEETS—SHEET 1.
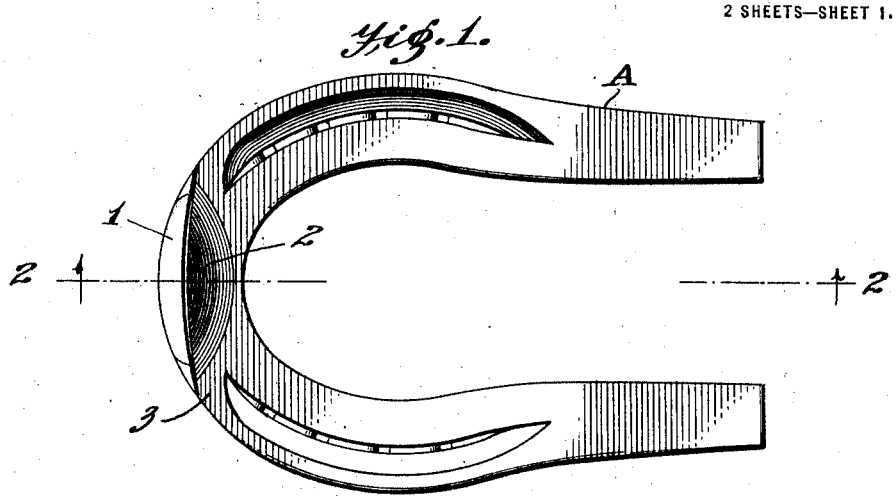
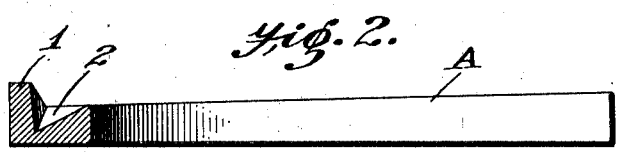
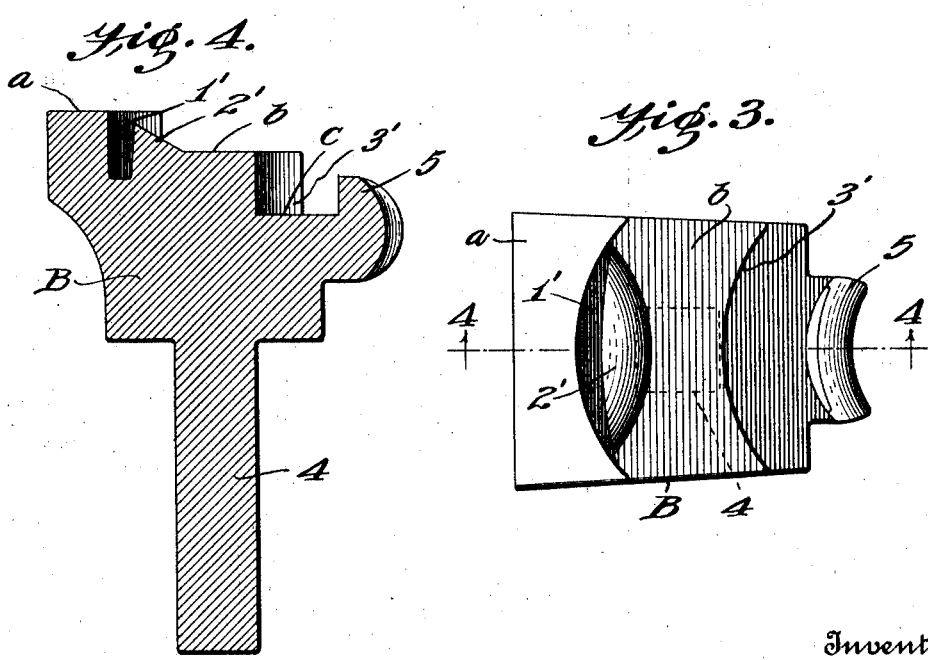
Inventor
T. H. Freeman,
By Mason Fenwick & Lawrence,
Attorneys T. H. FREEMAN.
PROCESS AND INSTRUMENTALITY FOR MAKING HORSESHOES.
APPLICATION FILED OCT. 4, 1919.
1,360,204.
Patented Nov. 23, 1920.
2 SHEETS—SHEET 2.
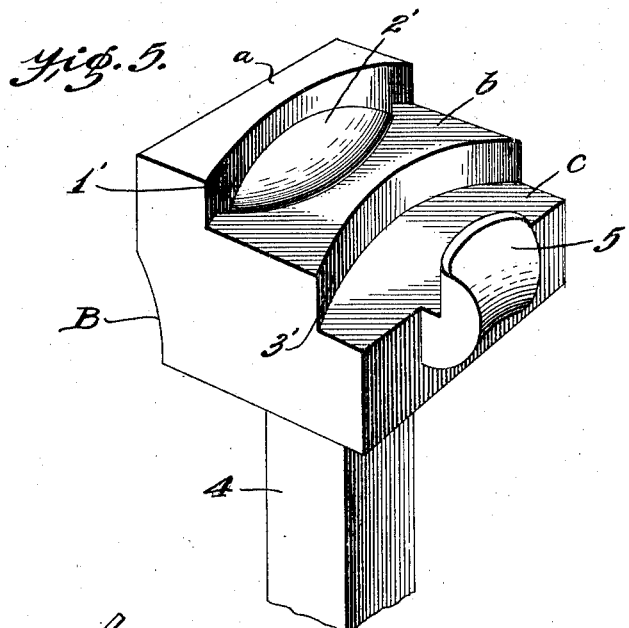
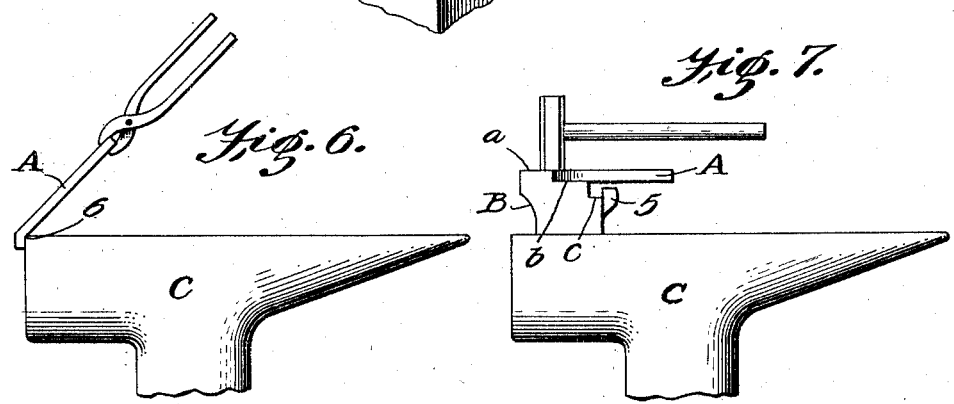
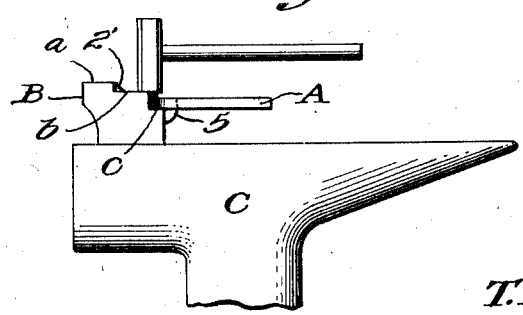
Inventor
T. H. Freeman,
By Bacon Fenwick & Lawrence,
Attorneys

UNITED STATES PATENT OFFICE.

THOMAS H. FREEMAN, OF LYNCH MINES, KENTUCKY.

PROCESS AND INSTRUMENTALITY FOR MAKING HORSESHOES.

1,360,204.   Specification of Letters Patent.   Patented Nov. 23, 1920.

Application filed October 4, 1919. Serial No. 328,377.

*To all whom it may concern:*

Be it known that I, THOMAS H. FREEMAN, a citizen of the United States, residing at Lynch Mines, in the county of Harlan and State of Kentucky, have invented certain new and useful Improvements in Processes and Instrumentality for Making Horseshoes; and I do hereby declare the following to be a full, clear, and exact description of the invention, such as will enable others skilled in the art to which it appertains to make and use the same.

This invention relates to horse-shoes and the art of making them.

One object of the invention is to provide a comfortable shoe for a horse or mule that affords the animal a good hold upon the ground without raising his toe abnormally above the surface of the ground upon which he is walking.

A further object is economy of material and time in the manufacture of horse-shoes with integral calks.

The invention comprises a process and instrumentality for making a horse-shoe having a toe-calk projected from the tread surface of the shoe, and having a cavity in the tread surface of the shoe adjacent the base of the calk, whereby a firm hold upon the ground may be obtained by the animal, when walking or running, with a shallow calk, because not only does the calk penetrate the ground to a depth determined by the extent of projection of the calk beyond the tread surface of the shoe, but the material of the ground or other surface upon which the animal is traveling is pressed up into the cavity and affords additional hold upon the ground to prevent the animal from slipping; thus with the same projection of calk as in prior shoes, a better grip may be obtained, or an equal grip with a shallower calk, resulting in greater comfort for the animal.

The invention also comprises the process of making horse-shoes with integral calks by forging or swaging the horse-shoe blank so as to form a depression or cavity in the tread surface of the shoe and at the same time flowing the metal, displaced in producing the depression, laterally and outward into the body of the calk, thereby economizing metal and rendering unnecessary the formation of special blanks provided with projections from which to forge the calk or special calk blanks to be welded to the shoe.

The invention also comprises a swage block adapted to serve in coöperation with an anvil and forging hammer as an instrumentality whereby the said process may be readily practised.

In the drawings:

Figure 1 is a plan view of my improved shoe viewed from the under side or looking toward the tread surface;

Fig. 2 is a sectional view on the line 2—2 of Fig. 1;

Fig. 3 is a top plan view of a swage block adapted to be seated in the hardy-hole of an anvil;

Fig. 4 is a vertical section through the swage block on line 4—4 of Fig. 3;

Fig. 5 is a perspective view of the improved swage block;

Fig. 6 illustrates conventionally the first steps in the process of forming the toe calk;

Fig. 7 illustrates the second step in said process, in which the improved swage block is used;

Fig. 8 illustrates a third or finishing step, in which the swage block is used.

Similar reference characters designate corresponding parts throughout the several views.

In the drawings a shoe or shoe blank comprising my improvement is indicated by the letter A. The shoe shown is without heel calks, my invention relating solely to the toe of the shoe and the method and means of forming that part of the shoe. The calk shown is formed integrally with the body of the shoe and is projected above the tread surface to a suitable extent to accomplish the purposes of my invention but not, as will be observed, to an excessive extent, as is customary in shoes having calks designed to give a firm grip on slippery ground. Rearward of the calk is a depression 2 forged into the tread surface of the shoe, the front wall of the depression coinciding with the rear wall of the calk as shown.

By this construction an extent of rear wall is provided on the calk 1 which is practically twice as great as in a calk of the same height above the tread surface if there were no depression 2, and the toe of the horse is not lifted abnormally from the ground. When walking a horse or mule does not dig his toes into the ground and the presence of a lonk calk is then undesirable. When pulling hard a horse or mule digs his toes into the earth and at such times an animal wearing my improved shoe can obtain as good a hold upon the ground as with shoes with the customary long calk, while at the same time the animal may be comfortable when walking easily and dragging no heavy load.

No special blanks are necessary in the process of manufacturing this shoe. Much of the metal that constitutes the calk is caused to flow or to be displaced from the depression 2 and forged into the calk. In practising this process an ordinary shoe blank is taken, heated to a forging temperature and the toe portion is incipiently bent and swaged over the edge of an anvil or swage block as indicated in Fig. 6, numeral 6 in said figure indicating the corner of an anvil or swage block over which the blanks may be bent and hammered. After forming the incipient calk, or turning up and swaging the toe portion of the blank slightly, as indicated in Fig. 6, the toe portion may be hammered or press forged so as to project more nearly perpendicularly to the tread surface of the shoe blank. The cavity or depression 2 will also be forged into the tread surface of the blank adjacent the incipient calk and the metal displaced by the forging operation in forming the depression will be caused to flow outward and into the incipient calk. The calk may then be shaped to finish by careful forging and the toe portion of the shoe be brought to the form and position illustrated in Figs. 1 and 2.

In performing the various swaging operations necessary to the formation of the toe portion of this shoe, a swage block such as is illustrated in Figs. 3, 4 and 5 is of great assistance. This swage block, designated B in the drawings, is provided with a shank 4 adapted to fit in a hardy-hole of an anvil C. Its operative surface comprises three distinct steps $a$, $b$ and $c$. As shown, the surface $a$ is at what may be called the front portion of the swage and the surface $c$ is at the rear portion thereof, the surface $b$ being intermediate the surfaces $a$ and $c$ and also located in a plane between the planes of said surfaces $a$ and $c$. The distance between the plane of the surface $a$ and of the surface $b$ is equal to the thickness of the shoe blank to be swaged, while the surface $c$ is at a distance below the surface $b$ that is equal to the entire distance from the edge of the calk 1 to that surface of the shoe that comes next to the hoof of the animal. The rear wall 1' of the elevation having the surface $a$ is preferably curved to substantially the curvature of the front of the shoe. So also with the rear wall 3' adjacent the surface $b$, which forms the front wall adjacent the surface $c$. Rearward of the surface $c$ is a curved lip 5 adapted to conform to the interior curvature of the front of the shoe. Rearward of the surface $a$ is a cavity or depression of a depth extending below the surface $b$, said cavity conforming substantially to the shape desired to be given to the calk and having the said wall 1' as its front boundary. Rearward of the cavity and inclining forward and upward from the surface $b$ is a swage-boss 2' adapted to form the cavity 2 in the shoe.

In using the described swage block to practice my process I may use the upper forward straight edged corner of the swage block to assist in producing the incipient calk, or it may be produced on the anvil as indicated in Fig. 6. After the incipient calk has been formed the shoe blank should be placed tread surface downward upon the swage block B with the incipient calk fitted as nearly as possible into the cavity rearward of wall 1'. By smart blows of a hammer the shoe blank should be driven down until its tread surface contacts with the surface $b$ and that portion of the shoe which comes in contact with the hoof is flush with the surface $a$. When this occurs no more hammering is necessary at this time. The swage-boss 2' will have formed the cavity in the tread surface of the shoe and will have caused the metal displaced therefrom to enter and assist in the formation of the calk 1. After the calk has thus been formed the shoe may be turned over and seated in the cavity rearward of wall 3', the bottom of which is the surface $c$. The edge of the calk will extend flush with or a trifle higher than the surface $b$. If it is not true and of proper height it may now be hammered until it is flush with the surface $b$. This last operation will complete the shoe in so far as my invention is concerned except for any necessary straightening or truing which may be done on the flat of the anvil C.

In practising this process with the aid of my improved swage I have been able to form the toe portion of a shoe in one half a minute, whereas I find it takes me seven minutes to weld a separate calk in place. In addition to the saving of time I have also saved material and have made a more efficient shoe that is more comfortable to the animal than one of equal holding capacity of prior types known to me.

I have found that this calk does not wear away as quickly as the ordinary calks since the cavity in its rear with its front wall merging into the rear wall of the calk tends to keep the calk sharp, and even when the calk 1 is worn down flush with the tread surface of the shoe A it still has a very considerable holding capacity and gives the animal a good grip upon the ground in the effort to get a firm footing. The calk 1 may indeed be originally formed so as to extend flush with the tread surface of the shoe, and still possess good ground-gripping capacity owing to the presence of the cavity and rear wall 1'.

Having thus described my invention, what I claim and desire to secure by Letters Patent is as follows:

1. A process of forging horse-shoes which consists in forging a depression into the tread surface of the shoe, displacing the metal by said forging operation and causing it to flow laterally and away from the surface of the shoe to form a calk.

2. The process of forming a toe calk which consists in selecting a previously formed blank of the outline of a horse-shoe, upsetting the metal on the toe portion of the shoe, forging a depression rearward of the upset portion and thereby displacing and causing the metal to flow into the incipient calk, and thereafter die-swaging the shoe to shape the calk and depressed portion of the shoe.

3. The process of forming integral calks on shoes which consists in forging a depression in the shoe and thereby displacing the metal laterally and outward of the surface of the shoe and forging the displaced part into a projecting calk.

4. A swage block having two stepped surfaces spaced apart a distance substantially equal to the thickness of a horse-shoe, said swage block having a cavity substantially transverse of said surfaces and separating them, the cavity extending below the plane of the lower surface, and a swaging boss rising from said lower surface and terminating at the rear wall of said cavity.

5. A swage block having a cavity provided with a plane bottom surface and substantially concentrically curved sides, said swage block having a second surface elevated above the bottom surface of said cavity and above the rear wall thereof.

In testimony whereof I affix my signature.

THOMAS H. FREEMAN.